United States Patent
Hijikata et al.

(10) Patent No.: US 10,280,594 B2
(45) Date of Patent: May 7, 2019

(54) HYDRAULIC ENERGY REGENERATION SYSTEM FOR WORK MACHINE

(71) Applicant: Hitachi Construction Machinery Co., Ltd., Taito-ku, Tokyo (JP)

(72) Inventors: Seiji Hijikata, Tsukuba (JP); Kouji Ishikawa, Kasumigaura (JP); Shinya Imura, Toride (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 79 days.

(21) Appl. No.: 15/554,601

(22) PCT Filed: Feb. 23, 2016

(86) PCT No.: PCT/JP2016/055305
§ 371 (c)(1),
(2) Date: Aug. 30, 2017

(87) PCT Pub. No.: WO2016/194415
PCT Pub. Date: Dec. 8, 2016

(65) Prior Publication Data
US 2018/0044890 A1   Feb. 15, 2018

(30) Foreign Application Priority Data

Jun. 2, 2015   (JP) .................................. 2015-112533

(51) Int. Cl.
*F15B 11/17*   (2006.01)
*F15B 21/14*   (2006.01)
(Continued)

(52) U.S. Cl.
CPC .......... *E02F 9/2217* (2013.01); *E02F 9/2095* (2013.01); *E02F 9/2225* (2013.01);
(Continued)

(58) Field of Classification Search
CPC ........ F15B 11/17; F15B 21/14; F15B 2211/88
(Continued)

(56) References Cited

U.S. PATENT DOCUMENTS

2006/0048508 A1   3/2006   Nakamura et al.
2013/0125539 A1   5/2013   Kobayashi et al.
(Continued)

FOREIGN PATENT DOCUMENTS

CN   1697933 A    11/2005
CN   102947599 A   2/2013
(Continued)

OTHER PUBLICATIONS

International Search Report (PCT/ISA/210) issued in PCT Application No. PCT/JP2016/055305 dated May 24, 2016 with English translation (three pages).

(Continued)

*Primary Examiner* — F Daniel Lopez
*Assistant Examiner* — Daniel S Collins
(74) *Attorney, Agent, or Firm* — Crowell & Moring LLP

(57) ABSTRACT

A hydraulic fluid energy regeneration system for a work machine capable of securely maintaining a brake pressure even when a solenoid valve or the like is erroneously rendered open by an electrical failure is provided. The hydraulic fluid energy regeneration system for a work machine, including a first hydraulic actuator; a second hydraulic actuator; and a first hydraulic pump that supplies a hydraulic fluid to the first hydraulic actuator via a first hydraulic line, includes: an upper control valve that is connected to a discharge side on which the hydraulic fluid is discharged from the second hydraulic actuator when an object to be driven by the second hydraulic actuator falls under its own weight, and that can regulate a flow rate of the hydraulic fluid discharged from the second hydraulic actua- (Continued)

tor; a communication hydraulic line that connects the upper control valve to a hydraulic fluid tank; a lower control valve that is provided in the communication hydraulic line and that can regulate a flow rate of the hydraulic fluid discharged from the upper control valve to the hydraulic fluid tank; and a regeneration hydraulic line that has one end side connected to a branch section between the upper control valve and the lower control valve in the communication hydraulic line and that has an other end side connected to the first hydraulic line.

10 Claims, 5 Drawing Sheets

(51) Int. Cl.
  *E02F 9/22* (2006.01)
  *E02F 9/20* (2006.01)
  *F15B 11/024* (2006.01)
  *E02F 9/26* (2006.01)

(52) U.S. Cl.
  CPC .......... *E02F 9/2235* (2013.01); *E02F 9/2271* (2013.01); *E02F 9/2285* (2013.01); *E02F 9/2292* (2013.01); *E02F 9/2296* (2013.01); *E02F 9/268* (2013.01); *F15B 11/024* (2013.01); *F15B 11/17* (2013.01); *F15B 21/14* (2013.01); *B60Y 2200/412* (2013.01); *F15B 2211/20576* (2013.01); *F15B 2211/3059* (2013.01); *F15B 2211/30595* (2013.01); *F15B 2211/3157* (2013.01); *F15B 2211/353* (2013.01); *F15B 2211/6313* (2013.01); *F15B 2211/6316* (2013.01); *F15B 2211/7142* (2013.01); *F15B 2211/88* (2013.01)

(58) Field of Classification Search
  USPC .......................................................... 60/414
  See application file for complete search history.

(56) References Cited

U.S. PATENT DOCUMENTS

2014/0245729 A1   9/2014  Nanjo et al.
2017/0276155 A1*  9/2017  Hijikata ................... E02F 9/22

FOREIGN PATENT DOCUMENTS

| CN | 103890412 A   | 6/2014 |
| JP | 63-24402 U    | 2/1988 |
| JP | 3-23197 A     | 1/1991 |
| JP | 8-219121 A    | 8/1996 |
| JP | 2001-253649 A | 9/2001 |
| JP | 2006-9888 A   | 1/2006 |
| JP | 2008-25706 A  | 2/2008 |
| JP | 2008-128464 A | 6/2008 |

OTHER PUBLICATIONS

Japanese-language Written Opinion (PCT/ISA/237) issued in PCT Application No. PCT/JP2016/055305 dated May 24, 2016 (three pages).
International Preliminary Report on Patentability (PCT/IB/338 & PCT/IB/373) issued in PCT Application No. PCT/JP2016/055305 dated Dec. 14, 2017, including English translation of document C2 (Japanese-language Written Opinion (PCT/ISA/237)) previously filed on Aug. 30, 2017 (six (6) pages).
Japanese-language Office Action issued in counterpart Japanese Application No. 2015-112533 dated Apr. 3, 2018 (six pages).
Chinese-language Office Action issued in counterpart Chinese Application No. 201680008347.8 dated Mar. 23, 2018 (six pages).

* cited by examiner ized excavator as an example of the work machine.

HYDRAULIC ENERGY REGENERATION SYSTEM FOR WORK MACHINE

TECHNICAL FIELD

The present invention relates to a hydraulic fluid energy regeneration system for a work machine.

BACKGROUND ART

There is disclosed, with an aim to provide a hydraulic control circuit simple in configuration, excellent in operability, and high in energy efficiency, a hydraulic control circuit for a work machine including: a variable displacement pump; a regenerative circuit that branches off from a hydraulic line between a discharge side of a boom cylinder rendered operative by a hydraulic fluid supplied from the pump via a boom control valve and a flow control valve regulating a flow rate on the discharge side and that communicates with a delivery side of the pump; and a controller that controls the flow control valve such that the hydraulic fluid on the discharge side of the boom cylinder is returned, for regeneration, to the delivery side of the pump through the regenerative circuit when a pressure on the discharge side is higher than a delivery pressure of the pump, and that controls the pump such that when the regeneration is performed, a regenerative flow rate is subtracted from a target pump delivery flow rate set when the regeneration is not performed (refer to, for example, Patent Document 1).

PRIOR ART DOCUMENT

Patent Document

Patent Document 1: JP-2008-025706-A

SUMMARY OF THE INVENTION

Problem to be Solved by the Invention

According to the conventional technique described above, the hydraulic fluid discharged from a bottom-side hydraulic chamber of the boom cylinder when a boom that is an object to be driven by the boom cylinder falls under its own weight can be regenerated to drive another actuator.

However, with a configuration of the conventional technique described above, if a solenoid valve of the flow control valve for returning the return fluid from the boom cylinder to the delivery side of the pump electrically fails and is rendered open inadvertently, then the hydraulic fluid from the bottom-side hydraulic chamber of the boom cylinder passes through the solenoid valve and is discharged, possibly causing the boom cylinder to fall at an unintended high speed.

The present invention has been made on the basis of the abovementioned respects and its object is to provide a hydraulic fluid energy regeneration system for a work machine, capable of securely maintaining a brake pressure even if a solenoid valve or the like that constitutes the regeneration system is erroneously rendered open by an electrical failure.

Means for Solving the Problem

To attain the object, a first invention is a hydraulic fluid energy regeneration system for a work machine, including a first hydraulic actuator; a second hydraulic actuator configured with a hydraulic cylinder different from the first hydraulic actuator; a first hydraulic pump that supplies a hydraulic fluid to the first hydraulic actuator via a first hydraulic line; and a hydraulic fluid tank, the hydraulic fluid energy regeneration system including: an upper control valve that is connected to a discharge side on which the hydraulic fluid is discharged from the second hydraulic actuator when an object to be driven by the second hydraulic actuator falls under its own weight, and that can regulate a flow rate of the hydraulic fluid discharged from the second hydraulic actuator; a communication hydraulic line that connects the upper control valve to the hydraulic fluid tank; a lower control valve that is provided in the communication hydraulic line and that can regulate a flow rate of the hydraulic fluid discharged from the upper control valve to the hydraulic fluid tank; and a regeneration hydraulic line that has one end side connected to a branch section between the upper control valve and the lower control valve in the communication hydraulic line and that has an other end side connected to the first hydraulic line. The hydraulic fluid discharged from the second hydraulic actuator can be regenerated to the first hydraulic actuator.

Effect of the Invention

According to the present invention, it is possible to securely maintain a brake pressure even if a solenoid valve or the like that constitutes the regeneration system is erroneously rendered open by an electrical failure. As a consequence, it is possible to provide a safe and highly reliable hydraulic fluid energy regeneration system for a work machine.

MODES FOR CARRYING OUT THE INVENTION

Embodiments of a hydraulic fluid energy regeneration system for a work machine according to the present invention will be described hereinafter with reference to the drawings. It is noted that the description will be given referring to a hydraulic excavator as an example of the work machine.

First Embodiment

Figure 1:
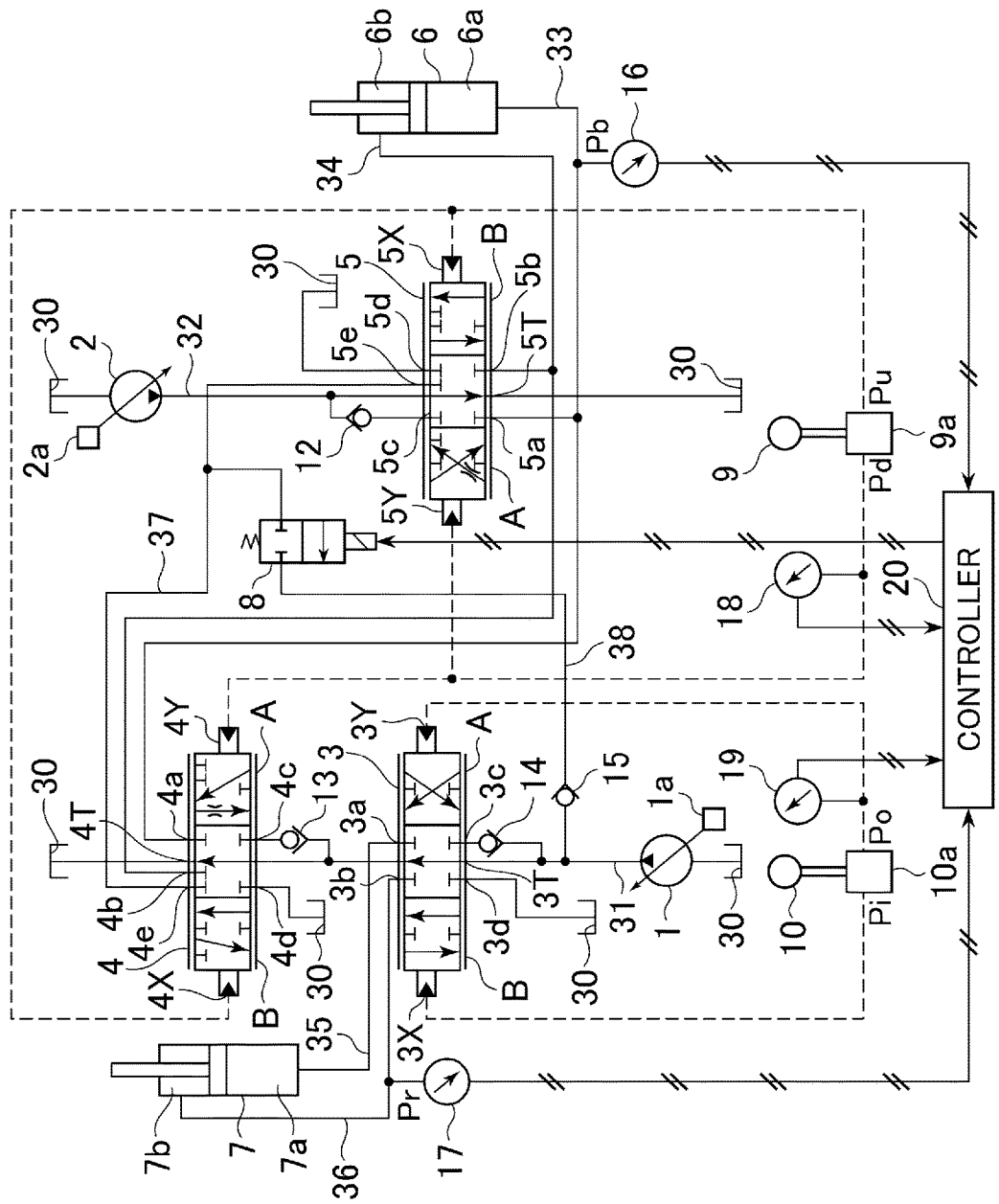
FIG. 1 is a schematic diagram of a control system showing a first embodiment of a hydraulic fluid energy regeneration system for a work machine according to the present invention.

FIG. 1 is a schematic diagram of a control system showing a first embodiment of a hydraulic fluid energy regeneration system for a work machine according to the present invention. In FIG. 1, a first hydraulic pump and a second hydraulic pump each of a variable displacement type driven by an engine that is not shown are denoted by the numbers 1 and 2, an arm control valve is denoted by the number 3, a boom lower control valve is denoted by the number 4, a boom upper control valve is denoted by the number 5, a boom cylinder that serves as a second hydraulic actuator is denoted by the number 6, an arm cylinder that serves as a first hydraulic actuator is denoted by the number 7, a regeneration valve, 9 denotes a boom operation device is denoted by the number 8, an arm operation device is denoted by the number 10, a controller (control means) is denoted by the number 20, and a hydraulic fluid tank is denoted by the number 30. Each of the first hydraulic pump 1 and the second hydraulic pump 2 includes, for example, a swash plate as a variable displacement mechanism, changes a displacement (displacement volume) of the pump by adjusting a tilting angle of the swash plate by a displacement control unit 1a or 2a, and controls a delivery flow rate of a hydraulic fluid.

The arm control valve 3 and the boom lower control valve 4 are disposed in order from an upstream side in series in a first main line 31 that supplies a hydraulic fluid delivered from the first hydraulic pump 1 to each of the actuators, i.e., the boom cylinder 6 and the arm cylinder 7. The boom upper control valve 5 is disposed in a second main line 32 that supplies a hydraulic fluid delivered from the second hydraulic pump 2 to the boom cylinder 6.

The arm control valve 3, which is a 3-position, 6-port switching control valve, switches a control valve position in response to pilot pressures supplied to two pilot operation unit 3X and 3Y thereof to vary an opening area of a hydraulic fluid flow passage. The arm control valve 3 thereby controls a direction and a flow rate of the hydraulic fluid supplied from the first hydraulic pump 1 to the arm cylinder 7 to drive the arm cylinder 7. Furthermore, the arm control valve 3 includes an inlet port 3c to which the hydraulic fluid is supplied from the first hydraulic pump 1, an outlet port 3d that communicates with the hydraulic fluid tank 30, a center port 3T that communicates with the hydraulic fluid tank 3 when being at a neutral position, and connection ports 3a and 3b that are connected to the arm cylinder 7 side. The arm control valve 3 is a center bypass type valve that leads the hydraulic fluid from the first hydraulic pump 1 to the hydraulic fluid tank 30 when being at a neutral position. It is noted that a check valve 14 that allows the hydraulic fluid to flow only from the first hydraulic pump 1 is provided in a line that connects the first main line 31 to the inlet port 3c.

Each of the boom lower control valve 4 and the boom upper control valve 5, which is a 3-position, 7-port switching control valve, switches its control valve position in response to pilot pressures supplied to two pilot operation units 4X and 4Y or 5X and 5Y thereof to vary an opening area of a hydraulic fluid flow passage. Specifically, when the pilot pressures are applied to the pilot operation units 4Y and 5Y, the boom lower control valve 4 moves in a left direction and the boom upper control valve 5 moves in a right direction, and the positions of the valves 4 and 5 are changed over to positions A. Conversely, when the pilot pressures are supplied to the pilot operation units 4X and 5X, the boom lower control valve 4 moves in the right direction and the boom upper control valve 5 moves in the left direction, and the positions of the valves 4 and 5 are changed over to positions B. Through these operations, the boom lower control valve 4 and the boom upper control valve 5 control a direction and a flow rate of the hydraulic fluid supplied to the boom cylinder 6 from the first hydraulic pump 1 and/or the second hydraulic pump 2 to drive the boom cylinder 6.

Furthermore, the boom upper control valve 5 includes an inlet port 5c to which the hydraulic fluid is supplied from the second hydraulic pump 2, an outlet port 5d that communicates with the hydraulic fluid tank 30, a connection port 5e that communicates with a communication line 37 to be described later, a center port 5T that communicate with the hydraulic fluid tank 30 when being at a neutral position, and connection ports 5a and 5b that are connected to the boom cylinder 6 side. The boom upper control valve 5 is a center bypass type valve that leads the hydraulic fluid from the second hydraulic pump 2 to the hydraulic fluid tank 30 when being at a neutral position. It is noted that a check valve 12 that allows the hydraulic fluid to flow only from the second hydraulic pump 2 is provided in a line that connects the second main line 32 to the inlet port 5c. Furthermore, a throttle is provided in an internal hydraulic line that communicates with the connection port 5a to the connection port 5e when the boom upper control valve 5 is at the position A.

Moreover, the boom lower control valve 4 includes an inlet port 4c to which the hydraulic fluid is supplied from the first hydraulic pump 1, an outlet port 4d that communicates with the hydraulic fluid tank 30, a connection port 4e that communicates with the communication line 37 to be described later, a center port 4T that communicate with the hydraulic fluid tank 30 when being at a neutral position, and connection ports 4a and 4b that are connected to the boom cylinder 6 side. The boom lower control valve 4 is a center bypass type valve that leads the hydraulic fluid from the first hydraulic pump 1 to the hydraulic fluid tank 30 when being at a neutral position. It is noted that a check valve 13 that allows the hydraulic fluid to flow only from the first hydraulic pump 1 is provided in a line that connects the first main line 31 to the inlet port 4c. Further, a throttle is provided in an internal hydraulic line that communicates with the connection port 4e to the connection port 4a when the boom lower control valve 4 is at the position A. Moreover, one end side of the communication line 37 is connected to the connection port 4e and the other end side of the communication line 37 is connected to the connection port 5e of the boom upper control valve 5.

The boom cylinder 6 has a cylinder and a piston rod, and the cylinder includes a bottom-side hydraulic chamber 6a and a rod-side hydraulic chamber 6b. One end side of a first line 33 is connected to the bottom-side hydraulic chamber 6a and the other end side of the first line 33 is connected to the connection port 4a of the boom lower control valve 4 and the connection port 5a of the boom upper control valve 5. One end side of a second line 34 is connected to the rod-side hydraulic chamber 6b and the other end side of the second line 34 is connected to the connection port 4b of the boom lower control valve 4 and the connection port 5b of the boom upper control valve 5. It is noted that a pressure sensor 16 that detects a pressure of the bottom-side hydraulic chamber 6a of the boom cylinder 6 is provided in the first line 33. A pressure signal Pb of the boom cylinder bottom-side hydraulic chamber 6a detected by the pressure sensor 16 is inputted to the controller 20.

The arm cylinder 7 has a cylinder and a piston rod, and the cylinder includes a bottom-side hydraulic chamber 7a and a rod-side hydraulic chamber 7b. One end side of a third line 35 is connected to the bottom-side hydraulic chamber 7a and the other end side of the third line 35 is connected to the connection port 3a of the arm control valve 3. One end side of a fourth line 36 is connected to the rod-side hydraulic chamber 7b and the other end side of the fourth line 36 is connected to the connection port 3b of the arm control valve 3. It is noted that a pressure sensor 17 that detects a pressure of the rod-side hydraulic chamber 7b of the arm cylinder 6 is provided in the fourth line 36. A pressure signal Pr of the arm cylinder rod-side hydraulic chamber 7b detected by the pressure sensor 17 is inputted to the controller 20.

The communication line 37 discharges return hydraulic fluid from the bottom-side hydraulic chamber 6a of the boom cylinder 6 to the hydraulic fluid tank 30 via the boom upper control valve 5 and the boom lower control valve 4. A branch section to which one end side of a regeneration line 38 is connected is provided in an intermediate section of the communication line 37. The other end side of the regeneration line 38 is connected to the first main line 31 via a check valve 15 that allows the hydraulic fluid to flow only from the regeneration line 38.

It is noted that the other end side of the regeneration line 38 is connected to a region of the first main line 31, the region being closer to the first hydraulic pump 1 than the check valve 14 provided in the line connected to the inlet port 3c of the arm control valve 3. Furthermore, a regeneration valve 8 that is a 2-port, 2-position solenoid selector valve is provided in the regeneration line 38. The regeneration valve 8 includes an operation unit that receives a command from the controller 20 and a spring section, and is controlled such that the regeneration valve 8 is at an interruption position when not receiving a command signal from the controller 20 and at an open operation position in response to the command signal.

The boom operation device 9 includes an operation lever and a pilot valve 9a, and generates a pilot pressure in response to an operation amount of a tilting operation of the operation lever. Pilot lines indicated by a broken line extend from the boom operation device 9 and are connected to the operation units 4X, 4Y, 5X, and 5Y of the boom lower control valve 4 and the boom upper control valve 5. When the operation lever is operated to a boom raising side, a generated boom-raising pilot pressure Pu is supplied to the operation unit 4X of the boom lower control valve 4 and the operation unit 5X of the boom upper control valve 5, and the boom lower control valve 4 and the boom upper control valve 5 each performs a switching control in response to this pilot pressure. Likewise, when the operation lever is operated to a boom lowering side, a generated boom-lowering pilot pressure Pd is supplied to the operation unit 4Y of the boom lower control valve 4 and the operation unit 5Y of the boom upper control valve 5, and the boom lower control valve 4 and the boom upper control valve 5 each performs a switching control in response to this pilot pressure.

The arm operation device 10 includes an operation lever and a pilot valve 10a, and generates a pilot pressure in response to an operation amount of a tilting operation of the operation lever. Pilot lines indicated by a broken line extend from the arm operation device 10 and are connected to the operation units 3X and 3Y of the arm control valve 3. When the operation lever is operated to a crowding side, a generated arm-crowding pilot pressure Pi is supplied to the operation unit 3X of the arm control valve 3, and the arm control valve 3 performs a switching control in response to this pilot pressure. Likewise, when the operation lever is operated to a dumping side, a generated arm-dumping pilot pressure Po is supplied to the operation unit 3Y of the arm control valve 3, and the arm control valve 3 performs a switching control in response to this pilot pressure.

A pressure sensor 18 that detects the boom-lowering pilot pressure Pd and a pressure sensor 19 that detects the arm-dumping pilot pressure Po are provided in the boom-lowering pilot line and the arm-dumping pilot line, respectively. Pressure signals detected by these pressure sensors 18 and 19 are inputted to the controller 20.

The boom cylinder bottom-side hydraulic chamber pressure Pb, the arm cylinder rod-side hydraulic chamber pressure Pr, the boom-lowering pilot pressure Pd, and the arm-dumping pilot pressure Po detected by the respective pressure sensors 16 to 19 are inputted to the controller 20, and the controller 20 outputs a control command to the regeneration valve 8 on the basis of these signals.

Operations of the first embodiment of the hydraulic fluid energy regeneration system for the work machine according to the present invention described above will next be described. An operator's boom lowering operation will first be described.

In FIG. 1, when the operation lever of the boom operation device 9 is operated to perform the boom lowering operation, the boom-lowering pilot pressure Pd generated from the pilot valve 9a is supplied to the operation unit 4Y of the boom lower control valve 4 and the operation unit 5Y of the boom upper control valve 5. In response to the pilot pressure Pd, the boom lower control valve 4 moves in the left direction, the boom upper control valve 5 moves in the right direction, and the valves 4 and 5 switch to the positions A.

As a result, the hydraulic fluid from the first hydraulic pump 1 passes through from the inlet port 4c to the connection port 4b of the boom lower control valve 4 and is supplied to the rod-side hydraulic chamber 6b of the boom cylinder 6 via the second line 34. Furthermore, the hydraulic fluid from the second hydraulic pump 2 passes through from the inlet port 5c to the connection port 5b of the boom upper control valve 5 and is supplied to the rod-side hydraulic chamber 6b of the boom cylinder 6 via the second line 34.

Meanwhile, the return hydraulic fluid discharged from the bottom-side hydraulic chamber 6a of the boom cylinder 6 passes through the first line 33 and through from the connection port 5a to the connection port 5e of the boom upper control valve 5, and flows into the communication line 37. The incoming hydraulic fluid is discharged from the connection port 4e of the boom lower control valve 4 through the restrictor provided inside and the outlet port 4d to the hydraulic fluid tank 30. In this way, the hydraulic fluids from the first hydraulic pump 1 and the second hydraulic pump 2 flow into the rod-side hydraulic chamber 6b of the boom cylinder 6, while the hydraulic fluid in the bottom-side hydraulic chamber 6a is discharged through the boom upper control valve 5 and the boom lower control valve 4 to the hydraulic fluid tank 30. As a result, the piston rod of the boom cylinder 6 is contracted and a boom moves in a lowering direction.

An operator's arm dumping operation will next be described.

In FIG. 1, when the operation lever of the arm operation device 10 is operated to perform the arm dumping operation, the arm-dumping pilot pressure Po generated from the pilot valve 10a is supplied to the operation unit 3Y of the arm control valve 3. In response to the pilot pressure Po, the arm control valve 4 moves in the left direction, and the arm control valve 3 switches to the position A.

As a result, the hydraulic fluid from the first hydraulic pump 1 passes through from the inlet port 3c to the connection port 3b of the arm control valve 3 and is supplied to the rod-side hydraulic chamber 7b of the arm cylinder 7 via the fourth line 36.

Meanwhile, the return hydraulic fluid discharged from the bottom-side hydraulic chamber 7a of the arm cylinder 7 passes through the third line 35 and through from the connection port 3a to the outlet port 3d of the arm control valve 3, and is discharged to the hydraulic fluid tank 30. In this way, the hydraulic fluid from the first hydraulic pump 1 flows into the rod-side hydraulic chamber 7b of the arm cylinder 7, while the hydraulic fluid in the bottom-side hydraulic chamber 7a is discharged through the arm control valve 3 to the hydraulic fluid tank 30. As a result, the piston rod of the arm cylinder 7 is contracted and an arm moves in a dumping direction.

Next, an operation for regenerating the return hydraulic fluid from the boom cylinder 6 to the arm cylinder 7 while the operator simultaneously performs the boom lowering operation and the arm dumping operation will be described. When the return hydraulic fluid from the boom cylinder 6 is regenerated to the arm cylinder 7, the regeneration valve 8 is controlled by the controller 20 as well as the boom lowering operation and the arm dumping operation described above. The operations of the first hydraulic pump 1, the second hydraulic pump 2, the arm control valve 3, the boom lower control valve 4, and the boom upper control valve 5 are the same as those described above and will therefore not be described in detail.

When the operation lever of the boom operation device 9 is operated to perform the boom lowering operation, the boom-lowering pilot pressure Pd generated from the pilot valve 9a is detected by the boom-lowering pilot pressure sensor 18 and inputted to the controller 20. In addition, when the operation lever of the arm operation device 10 is operated to perform the arm dumping operation, the arm-dumping pilot pressure Po generated from the pilot valve 10a is detected by the arm-dumping pilot pressure sensor 19 and inputted to the controller 20.

Furthermore, the pressure Pb of the bottom-side hydraulic chamber 6a of the boom cylinder 6 is detected by the boom cylinder bottom-side hydraulic chamber pressure sensor 16 and inputted to the controller 20. In addition, the pressure Pr of the rod-side hydraulic chamber 7b of the arm cylinder 7 is detected by the arm cylinder rod-side hydraulic chamber pressure sensor 17 and inputted to the controller 20.

The controller 20 calculates a command signal on the basis of each of the inputted signals, and outputs the command signal to the regeneration valve 8 to switch its position. When the regeneration valve 8 switches from the interruption position to the open operation position, the return hydraulic fluid discharged from the bottom-side hydraulic chamber 6a of the boom cylinder 6 flows into the communication line 37 passing through from the connection port 5a to the connection port 5e of the boom upper control valve 5 and flows into the regeneration line 38 via the regeneration valve 8. The return hydraulic fluid flowing into the regeneration line 38 flows into the first main line 31 that is on the delivery side of the first hydraulic pump 1 via the check valve 15. As a result, the return hydraulic fluid from the boom cylinder 6 is regenerated to the arm cylinder 7 via the arm control valve 3, and a driving speed of the piston rod of the arm cylinder 7 can be increased.

Furthermore, controlling the displacement control unit 1a of the first hydraulic pump 1 can suppress the delivery flow rate in the first hydraulic pump 1, and suppressing output power of the first hydraulic pump 1 can improve energy saving.

Figure 2:
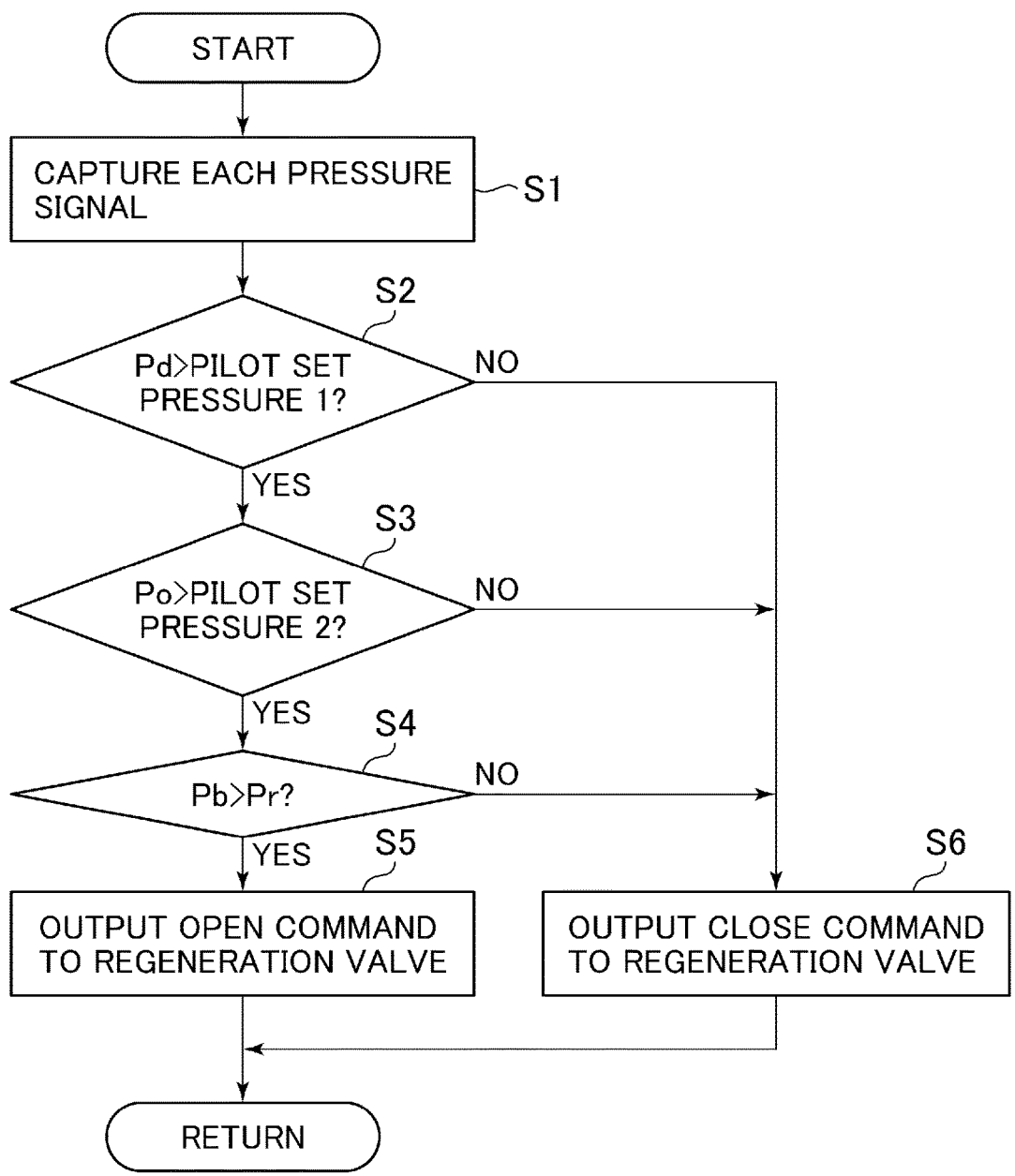
FIG. 2 is a flowchart illustrating processing by a controller that constitutes the first embodiment of the hydraulic fluid energy regeneration system for the work machine according to the present invention.

Processing by the controller 20 will next be described with reference to FIG. 2. FIG. 2 is a flowchart illustrating the processing by the controller that constitutes the first embodiment of the hydraulic fluid energy regeneration system for the work machine according to the present invention.

First, the controller starts the process when, for example, the operator turns a key switch (not shown) of the hydraulic excavator to the ON position. The controller 20 captures the pressure signals (the boom cylinder bottom-side hydraulic chamber pressure Pb, the arm cylinder rod-side hydraulic chamber pressure Pr, the boom-lowering pilot pressure Pd, and the arm-dumping pilot pressure Po) detected by the respective pressure sensors 16 to 19 (Step S1).

Next, the controller 20 judges whether the detected boom-lowering pilot pressure Pd is higher than a preset pilot set pressure 1 (Step S2). Specifically, the controller 20 judges whether the operation amount of the boom operation device 9 is equal to or larger than a predetermined operation amount. If the boom-lowering pilot pressure Pd is higher than the pilot set pressure 1 (the operation amount is equal to or larger than the predetermined operation amount), the controller 20 proceeds to Step S3; otherwise, the controller 20 proceeds to Step S6.

The controller 20 judges whether the detected arm-dumping pilot pressure Po is higher than a preset pilot set pressure 2 (Step S3). Specifically, the controller 20 judges whether the operation amount of the arm operation device 10 is equal to or larger than a predetermined operation amount. If the arm-dumping pilot pressure Po is higher than the pilot set pressure 2 (the operation amount is equal to or larger than the predetermined operation amount), the controller 20 proceeds to Step S4; otherwise, the controller 20 proceeds to Step S6.

The controller 20 judges whether the detected boom cylinder bottom-side hydraulic chamber pressure Pb is higher than the detected arm cylinder rod-side hydraulic chamber pressure Pr (Step S4). Specifically, the controller 20 judges whether the hydraulic fluid from the boom cylinder 6 can be regenerated to the arm cylinder 7. When the boom cylinder bottom-side hydraulic chamber pressure Pb is higher than the arm cylinder rod-side hydraulic chamber pressure Pr, the controller 20 proceeds to Step S5; otherwise, the controller 20 proceeds to Step S6.

The controller 20 outputs an open operation command to the regeneration valve 8 (Step S5). Specifically, when it is judged that the boom operation device 9 is operated to perform the boom lowering operation by the operation amount exceeding the predetermined amount, the arm operation device 10 is operated to perform the arm dumping operation by the operation amount exceeding the predetermined amount, and the boom cylinder bottom-side hydraulic chamber pressure Pb is higher than the arm cylinder rod-side hydraulic chamber pressure Pr, the controller 20 outputs a command signal to render the regeneration valve 8 open. By doing so, the regeneration valve 8 is rendered open, the return hydraulic fluid returning from the bottom-side hydraulic chamber 6a of the boom cylinder 6 flows into the communication line 37 and flows into the regeneration line 38 via the regeneration valve 8 and flows into the first main line 31 that is on the delivery side of the first hydraulic pump 1. As a result, the return hydraulic fluid from the boom cylinder 6 is regenerated to the arm cylinder 7 via the arm control valve 3. After performing Step S5, the controller 20 goes back to Step S1 via RETURN and starts the process again.

The controller 20 outputs a close command to the regeneration valve 8 (Step S6). Specifically, when it is judged that any one of conditions in Step S2, Step S3, and Step S4 is not satisfied, the controller 20 outputs the close command to the regeneration valve 8 to prevent the regeneration valve 8 from operating. In the present embodiment, the close command is realized by not outputting the open command signal. After performing Step S6, the controller 20 goes back to Step S1 via RETURN and starts the process again.

Figure 3:
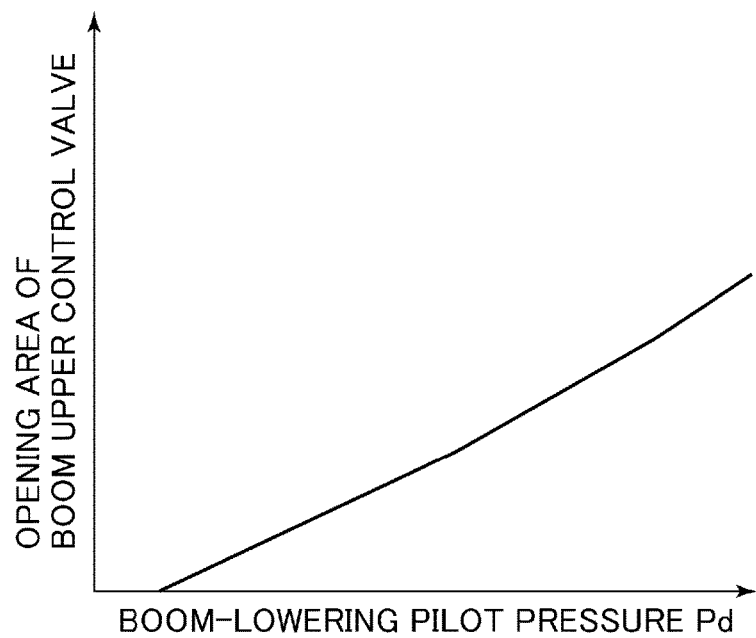
FIG. 3 is a characteristic diagram illustrating an opening area characteristic relative to a pilot pressure on an upper control valve that constitutes the first embodiment of the hydraulic fluid energy regeneration system for the work machine according to the present invention.

Next, an operation when the regeneration valve or the like is erroneously rendered open by an electrical failure will be described with reference to FIGS. 1 and 3. FIG. 3 is a characteristic diagram illustrating an opening area characteristic relative to a pilot pressure on the upper control valve that constitutes the first embodiment of the hydraulic fluid energy regeneration system for the work machine according to the present invention.

First, a case where the boom operation device 9 is not operated will be described. As shown in FIG. 1, when the bottom-side hydraulic chamber 6a of the boom cylinder 6 is being positioned at the most upstream of the return hydraulic fluid, the boom upper control valve 5 is being position upstream of the regeneration line 38 in which the regeneration valve 8 is disposed. When the boom operation device 9 is not operated, the boom-lowering pilot pressure Pd is not generated from the pilot valve 9a and the boom upper control valve 5 is thereby closed. Accordingly, even when the regeneration valve 8 being positioned downstream is erroneously rendered open, a state of the return hydraulic fluid from the bottom-side hydraulic chamber 6a of the boom cylinder 6 does not change, and inadvertent fall of the piston rod of the boom cylinder 6 does not occur.

Next, a case where the boom operation device 9 is fine-operated will be described. As described above, the throttle is provided in the internal hydraulic line that communicates with the connection port 5a to the connection port 5e when the boom upper control valve 5 is at the position A. This throttle appropriately restricts an opening area of the boom upper control valve 5 in response to the boom-lowering pilot pressure Pd as shown in FIG. 3. Therefore, even if the boom upper control valve 5 is rendered open and the regeneration valve 8 is erroneously rendered open by the fine operation of the boom operation device 9, it is possible to suppress a rapid increase in a falling speed of the piston rod of the boom cylinder 6 with the boom upper control valve adjusting the speed.

When the boom-lowering pilot pressure Pd corresponds to the fine operation, the boom upper control valve 5 is almost closed due to a characteristic shown in FIG. 3. As the boom-lowering pilot pressure Pd increases, the opening area of the boom upper control valve 5 gradually increases. It is thereby possible to ensure a brake pressure and provide for safety, irrespective of the operation amount of the boom lowering operation.

It is noted that energy of the return hydraulic fluid from the bottom-side hydraulic chamber 6a of the boom cylinder 6 at a time of the boom lowering operation is much higher than energy inputted from the first hydraulic pump 1 to the arm cylinder 7 at a time of the arm dumping operation. Therefore, even if the throttle is provided in the internal hydraulic line of the boom upper control valve 5 as described above to restrict a flow rate of the return hydraulic fluid from the bottom-side hydraulic chamber 6a of the boom cylinder 6 to some extent, it is possible to achieve improvement of the safety and energy saving efficiency while a regeneration amount used for the arm dumping is hardly affected.

Meanwhile, an ordinary hydraulic excavator commonly adopts a configuration in which the hydraulic fluid is supplied to the boom cylinder from two or more hydraulic pumps when the boom cylinder is operated for boom raising. In this case, as many control spools as the hydraulic pumps are necessary for switching and supplying the hydraulic fluid of the hydraulic pumps. On the other hand, only one control spool is disposed in many cases for regulating the hydraulic fluid discharged from the bottom-side hydraulic chamber of the boom cylinder to the hydraulic fluid tank 30 when the boom cylinder is operated for boom lowering. Therefore, some of the control spools may become redundant during the boom lowering operation.

In the first embodiment of the hydraulic fluid energy regeneration system for the work machine according to the present invention, two control spools necessary for the boom raising operation are also used for the boom lowering operation, i.e., one of the control spools is used as the boom upper control valve 4 while the throttle in the internal hydraulic line is used for safety, and the other is used as the boom lower control valve 5 while the throttle in the internal hydraulic line is used for speed adjustment. As a result, it is possible to provide the hydraulic fluid energy regeneration system for the work machine capable of securely maintaining a brake force even if the regeneration valve or the like is erroneously render open by an electrical failure, the system having the simple configuration in which the control spools necessary for the boom raising operation are commonly used for the boom lowering operation and having no extra control valves.

According to the first embodiment of the hydraulic fluid energy regeneration system for the work machine of the present invention described above, it is possible to securely maintain the brake pressure even if the regeneration valve 8 or the like constituting the regenerative system is erroneously render open by an electrical failure. As a consequence, it is possible to provide a safe and highly reliable hydraulic fluid energy regeneration system for a work machine.

According to the first embodiment of the hydraulic fluid energy regeneration system for the work machine of the present invention described above, when the return hydraulic fluid from the bottom-side hydraulic chamber 6a of the boom cylinder 6 at the time of the boom lowering operation is used for driving another hydraulic actuator such as the arm cylinder 7, the boom upper control valve 5 restricts and regulates the return hydraulic fluid upstream of the regeneration system. Therefore, it is possible to ensure the safety irrespective of the operation amount of the boom lowering operation. It is thereby possible to improve the safety and energy saving efficiency. Furthermore, since each of the control spools for the boom raising are also used for the boom lowering, it is possible to provide the hydraulic fluid energy regeneration system for the work machine, the system having the simple configuration and no extra valves.

Second Embodiment

Figure 4:
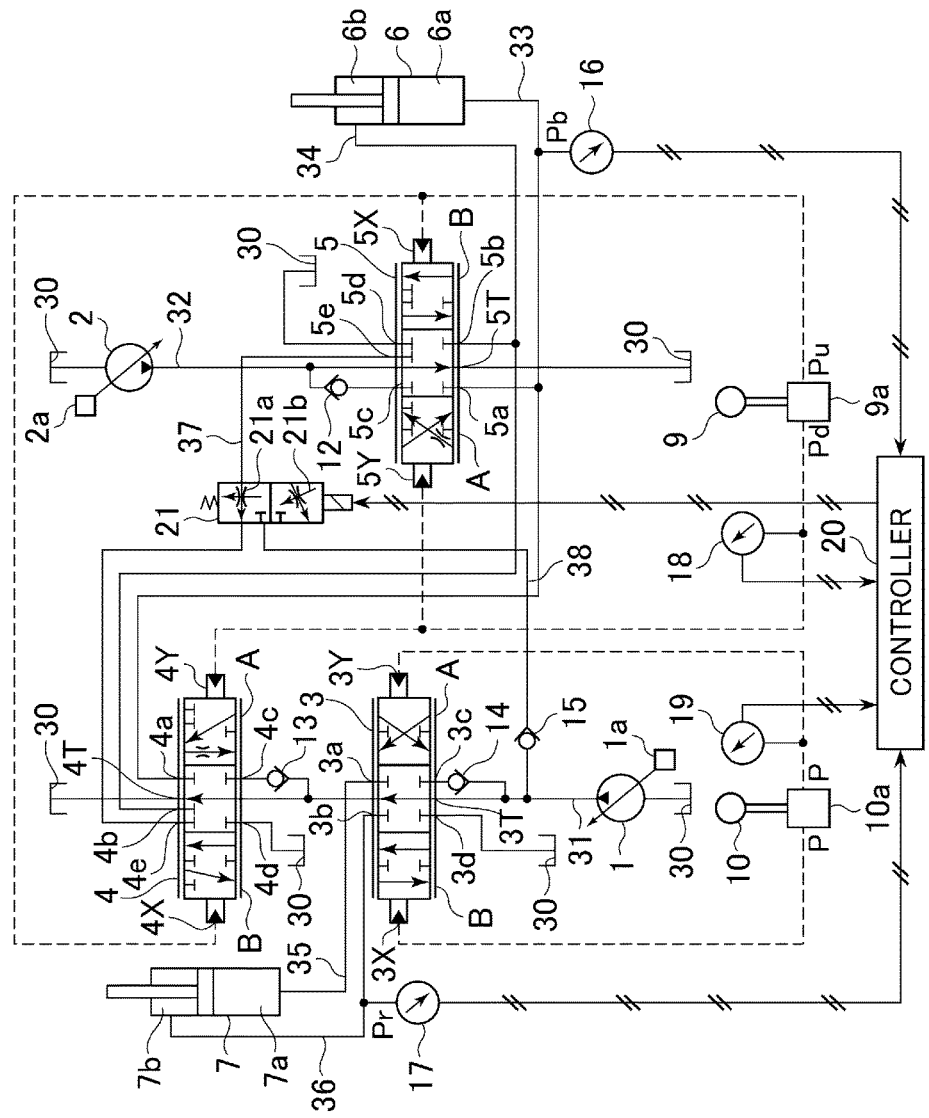
FIG. 4 is a schematic diagram of a control system showing a second embodiment of the hydraulic fluid energy regeneration system for the work machine according to the present invention.

A second embodiment of the hydraulic fluid energy regeneration system for the work machine according to the present invention will be described hereinafter with reference to the drawing. FIG. 4 is a schematic diagram of a control system showing the second embodiment of the hydraulic fluid energy regeneration system for the work machine according to the present invention.

In the second embodiment of the hydraulic fluid energy regeneration system for the work machine according to the present invention, the regeneration system is generally the same as the first embodiment but differs from the first embodiment in that the regeneration valve 8 is replaced by a solenoid selector valve 21. Specifically, as shown in FIG. 4, the selector valve 21 that is a 3-port, 2-position solenoid selector valve is provided in the communication line 37. The other end side of the communication line 37, the one end side of which is connected to the boom upper control valve 5, is connected to an inlet port of the selector valve 21, and the other end side of the communication line 37, the one end side of which is connected to the boom lower control valve 4, is connected to a first outlet port of the selector valve 21. One end side of the regeneration line 38 is connected to a second outlet port of the selector valve 21, and the other end side of the regeneration line 38 is connected to the first main line 31 via the check valve 15 that allows the hydraulic fluid to flow only from the regeneration line 38.

The selector valve 21 includes an operation unit that receives a command from the controller 20 and a spring section, and switches a flow passage of the return hydraulic fluid from the boom cylinder 6 by changing over to a position at which the hydraulic fluid of the communication line 37 flows to the boom lower control valve 4 when the selector valve 21 does not receive a command signal from the controller 20 and by changing over to a position at which the hydraulic fluid of the communication line 37 flows to the regeneration line 38 in response to the command signal. In two internal hydraulic lines of the selector valve 21, variable throttles 21a and 21b that can regulate an opening area of the hydraulic line at the side of the boom lower control valve 4 and an opening area of the hydraulic line at the side of the regeneration line 38 are provided, respectively.

With the configuration of the regeneration valve 8 according to the first embodiment, the return hydraulic fluid discharged from the bottom-side hydraulic chamber 6a of the boom cylinder 6 flows into the communication line 37 and flows into both the boom lower control valve 4 and the regeneration line 38. Accordingly, if a regeneration flow rate is excessively high, then the flow rate of the return hydraulic fluid discharged from the boom cylinder 6 increases, and the falling speed of the piston rod of the boom cylinder 6 may become excessively high.

By contrast, with a configuration of the selector valve 21 according to the present embodiment, the flow rate of the return hydraulic fluid flowing into the boom lower control valve 4 is reduced or set to zero, thereby making it possible to regenerate all the return hydraulic fluid discharged from the boom cylinder 6. It is thereby possible to further improve an energy saving effect.

Furthermore, even if an electrical failure causes the selector valve 21 to erroneously switch to the position at which the hydraulic fluid flows to the boom lower control valve 4 during regeneration, all the return hydraulic fluid discharged from the boom upper control valve 5 flows into the boom lower control valve 4 to enable a normal boom lowering operation. Accordingly, the rapid change in the speed of the piston rod of the boom cylinder 6 does not occur and the safety can be ensured.

The second embodiment of the hydraulic fluid energy regeneration system for the work machine according to the present invention described above can attain similar advantages as those of the first embodiment described above.

Moreover, according to the second embodiment of the hydraulic fluid energy regeneration system for the work machine of the present invention described above, in which the selector valve 21 is used, it is possible to further improve the energy saving effect, and it is possible to ensure the safety without the rapid change in the speed of the piston rod of the boom cylinder 6 even if an electrical failure causes the selector valve to be inadvertently switched during regeneration.

Furthermore, according to the second embodiment of the hydraulic fluid energy regeneration system for the work machine of the present invention described above, providing the variable throttles 21a and 21b in the two respective internal hydraulic lines of the selector valve 21 can reduce switching shock and suppress the rapid change in the speed of the piston rod of the boom cylinder 6. As a result, it is possible to improve operability and the safety.

While a case in which the variable throttle is provided in each of the two internal hydraulic lines of the selector valve 21 has been described in the present embodiment, the present invention is not limited to the case. Alternatively, the variable throttle may be provided in either the hydraulic line at the side of the regeneration line 38 or the hydraulic line at the side of the boom lower control valve 4.

Third Embodiment

Figure 5:
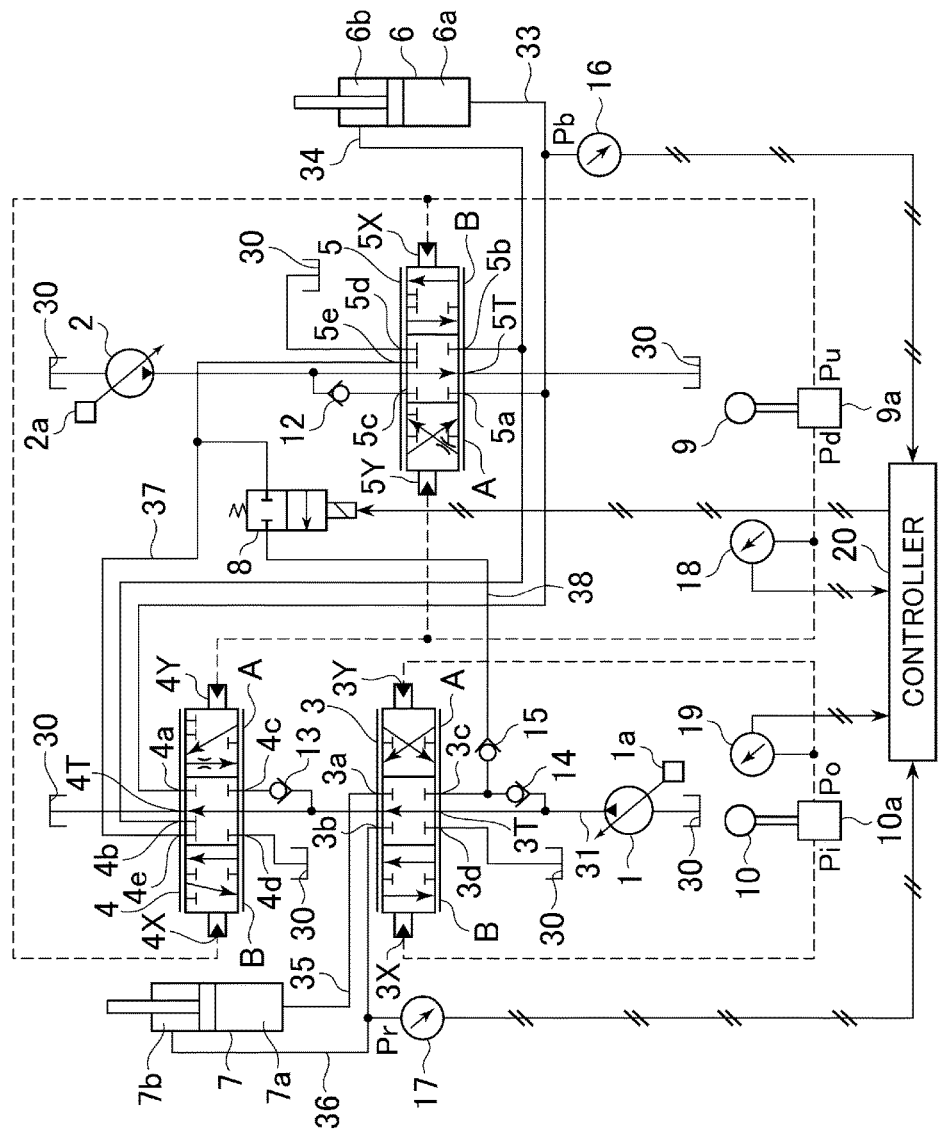
FIG. 5 is a schematic diagram of a control system showing a third embodiment of the hydraulic fluid energy regeneration system for the work machine according to the present invention.

A third embodiment of the hydraulic fluid energy regeneration system for the work machine according to the present invention will be described hereinafter with reference to the drawing. FIG. 5 is a schematic diagram of a control system showing the third embodiment of the hydraulic fluid energy regeneration system for the work machine according to the present invention.

In the third embodiment of the hydraulic fluid energy regeneration system for the work machine according to the present invention, the regeneration system is generally the same as the first embodiment but differs from the first embodiment by a connection point at which the other end side of the regeneration line 38 is connected to the first main line 31. Specifically, as shown in FIG. 5, the other end side of the regeneration line 38 is connected to a line between the inlet port 3c of the arm control valve 3 and the check valve 14.

By disposing a point where the hydraulic fluid from the first hydraulic pump 1 and the return hydraulic fluid from the regeneration line 38 joins together between the check valve 14 and the arm control valve 3, the pilot pressure is not generated from the pilot valve 10a and the arm control valve 3 is not switched when the operation lever of the arm operation device 10 is not operated. Accordingly, even if the regeneration valve 8 or the like that constitutes the regeneration system is erroneously render open by an electrical failure, the return hydraulic fluid is not discharged to the hydraulic fluid tank 30. It is thereby possible to prevent the piston rod of the boom cylinder 6 from falling against an operator's intention.

The third embodiment of the hydraulic fluid energy regeneration system for the work machine according to the present invention described above can attain similar advantages as those of the first embodiment described above.

Moreover, according to the third embodiment of the hydraulic fluid energy regeneration system for the work machine of the present invention, the point where the hydraulic fluid from the first hydraulic pump 1 and the return hydraulic fluid from the regeneration line 38 joins together is disposed between the check valve 14 and the arm control valve 3. Accordingly, even if the regeneration valve 8 or the like is erroneously rendered open by an electrical failure when the operation lever of the arm operation device 10 is not operated and the arm control valve 3 is not switched, then the return hydraulic fluid is not discharged to the hydraulic fluid tank 30, and it is possible to prevent the unintended falling of the piston rod of the boom cylinder 6. As a result, it is possible to further improve the safety.

Furthermore, the present invention is not limited to the first to third embodiments described above but encompasses various modifications. The abovementioned embodiments have been described in detail to explain the present invention comprehensively. The present invention is not necessarily limited to the embodiments having all the configurations described so far. For example, the configuration of an embodiment can be partially replaced by the configuration of another embodiment, or the configuration of another embodiment can be added to the configuration of an embodiment. Furthermore, for a part of the configuration of each embodiment, addition, deletion, and/or replacement of the other configuration can be made.

DESCRIPTION OF REFERENCE CHARACTERS

1: First hydraulic pump
2: Second hydraulic pump
3: Arm control valve
4: Boom lower control valve
5: Boom upper control valve
6: Boom cylinder (second hydraulic actuator)
6a: Bottom-side hydraulic chamber
6b: Rod-side hydraulic chamber
7: Arm cylinder (first hydraulic actuator)
7a: Bottom-side hydraulic chamber
7b: Rod-side hydraulic chamber
8: Regeneration valve
9: Boom operation device
10: Arm operation device
14: Check valve (non-return valve) for arm control valve
15: Check valve for regeneration line
16: Boom cylinder bottom-side hydraulic chamber pressure sensor
17: Arm cylinder rod-side hydraulic chamber pressure sensor
18: Boom-lowering pilot pressure sensor
19: Arm-dumping pilot pressure sensor
20: Controller
21: Selector valve
21a: Variable throttle
21b: Variable throttle
30: Hydraulic fluid tank
31: First main line (first hydraulic line)
32: Second main line (second hydraulic line)
33: First line (third hydraulic line)
34: Second line
37: Communication line (communication hydraulic line)
38: Regeneration line (regeneration hydraulic line)

The invention claimed is:

1. A hydraulic fluid energy regeneration system for a work machine, including a first hydraulic actuator; a second hydraulic actuator configured with a hydraulic cylinder different from the first hydraulic actuator; a first hydraulic pump that supplies a hydraulic fluid to the first hydraulic actuator via a first hydraulic line; and a hydraulic fluid tank, the hydraulic fluid energy regeneration system comprising:
an upper control valve that is connected to a discharge side on which the hydraulic fluid is discharged from the second hydraulic actuator when an object to be driven by the second hydraulic actuator falls under an own weight, and that can regulate a flow rate of the hydraulic fluid discharged from the second hydraulic actuator;
a communication hydraulic line that connects the upper control valve to the hydraulic fluid tank;
a lower control valve that is provided in the communication hydraulic line and that can regulate a flow rate of the hydraulic fluid discharged from the upper control valve to the hydraulic fluid tank; and
a regeneration hydraulic line that has one end side connected to a branch section between the upper control valve and the lower control valve in the communication hydraulic line and that has an other end side connected to the first hydraulic line, wherein
the hydraulic fluid discharged from the second hydraulic actuator can be regenerated to the first hydraulic actuator.

2. The hydraulic fluid energy regeneration system for a work machine according to claim 1, further comprising
a hydraulic pilot type operation device for operating the second hydraulic actuator, wherein
the upper control valve operates at least on the basis of a pilot pressure generated by the hydraulic pilot type operation device.

3. The hydraulic fluid energy regeneration system for a work machine according to claim 1, further comprising:
a first hydraulic actuator operation device for operating the first hydraulic actuator; and
a first hydraulic actuator control valve that is provided in the first hydraulic line and that is operated by the first hydraulic actuator operation device, wherein
the first hydraulic actuator control valve is a center bypass type valve that leads the hydraulic fluid from the first hydraulic pump to the hydraulic fluid tank in a state in which the first hydraulic actuator operation device is not operated.

4. The hydraulic fluid energy regeneration system for a work machine according to claim 1, further comprising:
a first hydraulic actuator operation device for operating the first hydraulic actuator, and a first hydraulic actuator control valve that is operated by the first hydraulic actuator operation device and that regulates a direction and a flow rate of the hydraulic fluid supplied from the first hydraulic pump to the first hydraulic actuator; and
a check valve that is provided between the first hydraulic pump and the first hydraulic actuator control valve and that prevents the hydraulic fluid from flowing backward from the first hydraulic actuator to the first hydraulic pump, wherein
the other end side of the regeneration hydraulic line is connected between the first hydraulic actuator control valve and the check valve.

5. The hydraulic fluid energy regeneration system for a work machine according to claim 1, wherein
a regeneration valve that can regulate a flow rate of the hydraulic fluid to be regenerated is provided in the regeneration hydraulic line.

6. The hydraulic fluid energy regeneration system for a work machine according to claim 5, wherein
a selector valve that can switch a delivery destination of the hydraulic fluid discharged from the upper control valve either to the regeneration hydraulic line or to the lower control valve is provided in place of the regeneration valve.

7. The hydraulic fluid energy regeneration system for a work machine according to claim 6, wherein
the selector valve includes a variable throttle provided in an internal hydraulic line at a side of the regeneration hydraulic line.

8. The hydraulic fluid energy regeneration system for a work machine according to claim 6, wherein the selector valve includes a variable throttle provided in an internal hydraulic line at a side of the lower control valve.

9. The hydraulic fluid energy regeneration system for a work machine according to claim 2, further comprising:
a second hydraulic pump that supplies the hydraulic fluid to the second hydraulic actuator via a second hydraulic line; and
a third hydraulic line that supplies the hydraulic fluid from the first hydraulic pump to the second hydraulic actuator, wherein
the upper control valve is provided in the second hydraulic line,
the lower control valve is provided in the third hydraulic line, and
when a hydraulic pilot type operation device for operating the second hydraulic actuator operates the object to be driven by the second hydraulic actuator in a rising direction, the hydraulic fluid from the first hydraulic pump is supplied to the second hydraulic actuator via the lower control valve and the hydraulic fluid from the second hydraulic pump is supplied to the second hydraulic actuator via the upper control valve.

10. The hydraulic fluid energy regeneration system for a work machine according to claim 2, further comprising:
a second hydraulic pump that supplies the hydraulic fluid to the second hydraulic actuator via a second hydraulic line; and
a third hydraulic line that supplies the hydraulic fluid from the first hydraulic pump to the second hydraulic actuator, wherein
the upper control valve is provided in the third hydraulic line,
the lower control valve is provided in the second hydraulic line, and
when a hydraulic pilot type operation device for operating the second hydraulic actuator operates the object to be driven by the second hydraulic actuator in a rising direction, the hydraulic fluid from the first hydraulic pump is supplied to the second hydraulic actuator via the upper control valve and the hydraulic fluid from the second hydraulic pump is supplied to the second hydraulic actuator via the lower control valve.

* * * * *